Sept. 30, 1952        C. A. DYER        2,612,539

CELL AND SUPPORT

Filed Aug. 15, 1946

*INVENTOR.*
CLARENCE A. DYER

BY *E. Willford Mason*

ATTORNEY.

Patented Sept. 30, 1952

2,612,539

UNITED STATES PATENT OFFICE 2,612,539

CELL AND SUPPORT

Clarence A. Dyer, Glenside, Pa., assignor, by mesne assignments, to Minneapolis-Honeywell Regulator Company, Minneapolis, Minn., a corporation of Delaware Application August 15, 1946, Serial No. 690,793

5 Claims. (Cl. 136—173)

The present invention relates to supports, and more particularly to a support that is specifically adapted to hold in operative position a standard cell of the type disclosed in the copending application of F. W. Side, Serial Number 690,792, filed August 15, 1946, now Patent 2,484,593, issued October 11, 1949.

The majority of H-shaped standard cells that are used in potentiometric instruments are mounted on a supporting plate by means of a strap that is passed around the cross piece of the cell. This strap is then attached to the plate in any suitable manner. The electrodes of the cell are then soldered to extension wires that are connected to suitable terminals. This type of mounting cannot be used with the standard cell of the Side application because of the fact that the cell is made in a different shape.

It is an object of the present invention to provide a support for mounting a standard cell. The support is so formed that the cell may easily be inserted into or removed from it with a single movement. It is not necessary to use any tools or separable parts since the support is fully self-contained.

It is a further object of the invention to provide a support for a standard cell in which the cell is connected to the circuit in which it is used by the mere act of placing the cell in its support. It is a further object of the invention to provide a standard cell with terminals that are rugged enough to cooperate with a support for the dual purpose of helping to hold the cell in place and connecting the cell in its circuit.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 3:
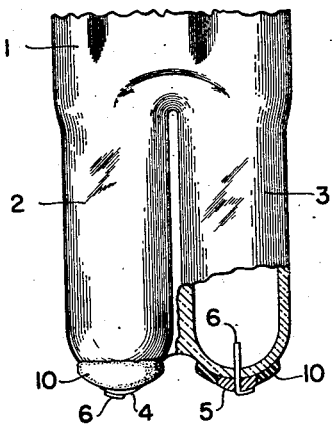
Figure 3 is a view, partly in section, of the lower portion of the cell.

In the drawing there is shown at 1 a standard cell of the type mentioned in the above identified Side application. This cell consists of a tubular body which has a pair of tubular legs 2 and 3 that are joined integrally therewith and in which the electrodes for the cell are placed. Referring to Figure 3, it will be seen that each leg is provided with an electrode 6 which consists of a small platinum wire. These electrodes are fused into the glass of which the cell is made and extend through the same. The outer end of each electrode extends through an opening in a metallic contact 4 or 5 which may be of brass or other suitable material. By reference to the drawing, it will be seen that these contacts are preferably dished so that they will fit snugly against the bottom of the legs. In applying the contacts to the cell each electrode 6 is passed through an opening in one of the contacts 5 and is bent into engagement with its outer surface. The electrodes are then preferably soldered to the contacts. The lower end of the cell is then dipped in sealing wax which serves to fasten the contacts tightly against the outer surface of the cell as is shown at 10. The sealing wax is scraped from the lower portion of the contacts and the electrodes so that a good electrical conducting surface is provided.

The support in which the cell is mounted consists of a strip of metal 6 to which is attached a suitably formed block 7 of some insulating material such as Bakelite. This block is attached to plate 6 by means of screws 8. The entire bracket may be mounted against any suitable supporting surface 9 by means of screws 11 which extend through the bracket and into the support. Parts 6 and 7 could, of course, be made of a single plastic moulding if desired.

The lower end of the standard cell comprising the legs 2 and 3 is placed in a recess 12 which is formed in block 7. Projecting into the lower portion 12A of this recess are a pair of contacts 13 and 14 that are adapted to engage respectively with contacts 4 and 5 on the lower end of cell. These contacts are provided on their upper ends with slightly concave plates 15 and 16 that are adapted to engage snugly the contacts on the standard cell. Normally, contacts 13 and 14 are biased upwardly by springs 17 and 18 into engagement with the contacts on the cell. This action in turn forces the cell upwardly so that a projection 19 on the upper end of the cell will be received by an opening 21 in a bent over portion 22 of the support 6. The lower end of each of the contacts 13 and 14 is provided with a collar 22 or 23, respectively, that limits the upward movement of the contact when the cell is not in place in its holder.

In order that the cell may be connected electrically in the circuit with which it is to be used in a convenient manner, each of the contacts has soldered to its lower end an extension wire 24 whose upper end is attached by engagement to a threaded sleeve 25 that is embedded in block 7. These extension wires 24 are separate and spaced apart from each other. The wires connecting the cell with the circuit in which it is used are held against sleeves 25 by means of screws 26 threaded into them. If it is desired, the entire assembly may be covered by a suitable cover 27 which is attached to the outer edges of plate 6 with a sliding fit or other detachable or permanent engagement.

Figure 1:
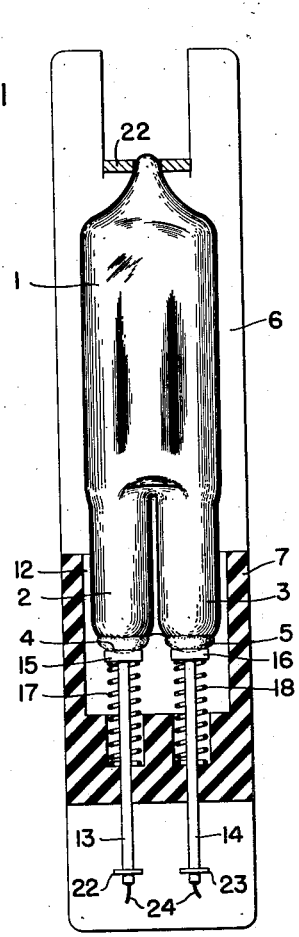
Figure 1 is a front view, partly in section, of the standard cell and its holder.
Figure 2:
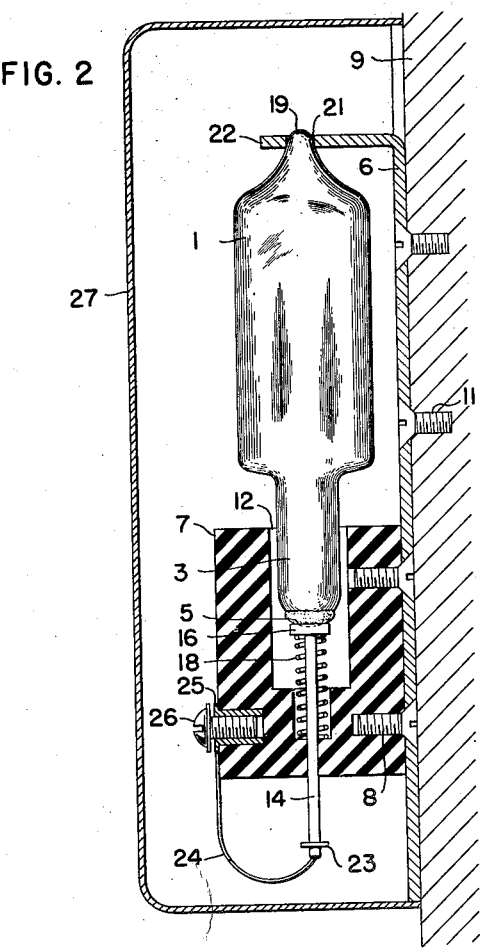
Figure 2 is a side view, partly in section, of the cell and its holder.

When it is desired to place the cell in the circuit it is only necessary to hold it in an upright position and to move the lower end of the cell into the recess 12. This operation will bring contacts 4 and 5 into engagement with contacts 15 and 16 respectively and will move these latter contacts downwardly against the force of springs 17 and 18. When the contacts have been moved downwardly enough the cell will be rocked in a clockwise direction in Figure 2 to bring projection 19 in line with opening 21. The cell will then be moved upwardly by the springs to hold it into position in its supporting bracket. In this position the cell is maintained upright and is connected electrically in any desired circuit.

From the above description it will be seen that I have provided a novel method of placing contacts on the legs of a standard cell which contacts are rugged enough to support the cell as well as to make a good electrical connection therewith. In addition, I have provided a supporting bracket that may be easily and inexpensively made and one which will hold a standard cell in operative position. The cell may simultaneously be placed in the bracket and in its circuit with a single movement that requires a minimum amount of care.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure with Letters Patent is:

1. A support for a standard cell having a body with a projection on top, a pair of legs extending from the lower end of the body and a contact on the end of each leg, said support comprising a base member, a forwardly projecting part on said base member, said part having an opening in it, a block of insulating material attached to said base member below said part, said block having a recess in its upper face to receive the legs of said cell, a pair of contacts slidably mounted in said block at the bottom of said recess, and biasing means to bias the contacts in said block into said recess whereby they can engage the contacts on a cell mounted therein, said biasing means acting through said contacts to move the projection of the cell into said opening in said part whereby a cell will be held in place in said recess and said opening.

2. A support for mounting a standard cell in a casing, said support including, a bracket having an upstanding perforated part, a block of insulating material having a chamber in it confronting the perforation in said part and adapted to receive in it the electrodes and the adjacent parts of a standard cell without engagement of the adjacent parts of the standard cell with the walls of the chamber, a pair of contacts slidably mounted in said block, a pair of springs each stressing one of said contacts into engagement with one of said electrodes and serving to yieldingly support a standard cell between said parts and said block, and a pair of electric conductors each connected to one of said contacts.

3. A support for mounting a standard cell on the flat wall of an instrument casing or the like, said support including, a flat strip of metal having a perforated bent-up portion struck up therefrom at an angle thereto, a block of insulating dielectric material having a cavity therein confronting the perforation in said bent-up portion and suitable for receiving the electrodes and the adjacent leg of a standard cell into the cavity without engagement between said legs and said electrodes and the walls of said cavity, a pair of contacts slidably mounted in said block and projecting into and spaced from the walls of said cavity, a pair of springs each encircling one of said contacts and stressing said contact against one electrode of the standard cell and serving to support yieldingly the standard cell between said portion and said block, a pair of flexible wires each connected to one of said contacts, and a pair of terminal posts mounted on an accessible portion of said block and each connected to one of said wires.

4. A support for mounting on the flat wall of an instrument casing or the like a standard cell encased in a tubular envelope having a projection at one end thereof and having a pair of hollow legs extending side by side from the other end of said envelope and having a pair of electrodes each extending through one end of one of said legs, said support including, a flat strip of metal having a portion struck up therefrom at an angle thereto and having a perforation in said portion adapted to receive in it the projection on the standard cell, a block of insulating material having a cavity therein confronting the perforation in said portion and large enough to receive in it the electrodes and the adjacent parts of the standard cell without contact of the legs and of the electrodes with the walls of said cavity, a pair of contacts slidably mounted in said block and projecting into and spaced from the walls of said cavity, a pair of springs each abutting at one end against said block of insulating material and encircling one of said contacts and stressing said contact against one electrode of the standard cell and serving to yieldingly support the standard cell between said portion and said block and to stress the projection on said standard cell yieldingly into said perforation, a pair of flexible wires each connected to one of said contacts, and a pair of terminal posts mounted on an accessible portion of said block and each connected to one of said wires.

5. A support for a standard cell having a body and a pair of legs and a contact on the end of each leg, said support including, a base having an abutment thereon, a socket of insulating material attached to said base, a pair of contacts in said socket and operative to engage the contacts on said cell so as to conduct electricity, and a pair of springs each biasing one contact in said socket into engagement with a contact on the cell and the cell into engagement with said abutment thereby to hold said cell yieldingly in a fixed position, said springs abutting at one end against said socket so that said springs do not conduct electricity.

CLARENCE A. DYER.

REFERENCES CITED

The following references are of record in the file of this patent:

UNITED STATES PATENTS

| Number | Name | Date |
|---|---|---|
| 494,827 | Weston | Apr. 4, 1893 |
| 1,136,404 | Buchanan | Apr. 20, 1915 |
| 1,337,160 | Riebeth | Apr. 13, 1920 |
| 1,497,786 | Hoge | June 17, 1924 |
| 1,760,178 | Seitz, Jr. | May 27, 1930 |
| 2,033,279 | Flynn | Mar. 10, 1936 |
| 2,284,547 | West | May 26, 1942 |
| 2,387,590 | Koenig et al. | Oct. 23, 1945 |
| 2,397,460 | Casanov | Apr. 2, 1946 |

FOREIGN PATENTS

| Number | Country | Date |
|---|---|---|
| 27,276 | Great Britain | Oct. 16, 1913 |
| 39,355 | Denmark | Oct. 15, 1928 |
| 551,598 | Great Britain | Mar. 2, 1943 |